United States Patent
Sivanesan et al.

(10) Patent No.: US 9,258,747 B2
(45) Date of Patent: Feb. 9, 2016

(54) USER EQUIPMENT AND METHODS FOR FAST HANDOVER FAILURE RECOVERY IN 3GPP LTE NETWORK

(71) Applicant: Intel IP Corporation, Santa Clara, CA (US)

(72) Inventors: Kathiravetpillai Sivanesan, Richardson, TX (US); Rath Vannithamby, Portland, OR (US); Candy Yiu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 41 days.

(21) Appl. No.: 14/279,562

(22) Filed: May 16, 2014

(65) Prior Publication Data

US 2015/0078335 A1    Mar. 19, 2015

Related U.S. Application Data

(60) Provisional application No. 61/879,014, filed on Sep. 17, 2013, provisional application No. 61/898,425, filed on Oct. 31, 2013.

(51) Int. Cl.
| | |
|---|---|
| *H04W 36/18* | (2009.01) |
| *H04W 36/00* | (2009.01) |
| *H04W 74/08* | (2009.01) |
| *H04L 29/06* | (2006.01) |
| *H04N 7/14* | (2006.01) |

(52) U.S. Cl.
CPC ........... *H04W 36/0016* (2013.01); *H04L 65/60* (2013.01); *H04N 7/147* (2013.01); *H04W 36/0055* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2011/0080825 | A1* | 4/2011 | Dimou | H04W 36/30 370/216 |
| 2012/0063298 | A1* | 3/2012 | Yi | H04W 56/00 370/216 |
| 2012/0088498 | A1* | 4/2012 | Xiao | H04W 24/02 455/424 |
| 2012/0202557 | A1* | 8/2012 | Olofsson | H04W 24/08 455/525 |
| 2012/0276897 | A1* | 11/2012 | Kwon | H04B 1/1027 455/423 |
| 2013/0183974 | A1* | 7/2013 | Johansson | H04W 76/027 455/436 |
| 2014/0148174 | A1* | 5/2014 | Teyeb | H04W 36/0083 455/441 |
| 2015/0207672 | A1* | 7/2015 | Xu | H04W 76/027 370/221 |

* cited by examiner

*Primary Examiner* — Anh-Vu Ly
(74) *Attorney, Agent, or Firm* — Schwegman Lundberg & Woessner, P.A.; Gregory J. Gorrie (57) ABSTRACT

Embodiments of User Equipment (UE) and methods for fast handover failure recovery in a 3GPP LTE network are generally described herein. In some embodiments, the UE may initiate handover (HO) failure recovery by transmission of a random-access channel (RACH) 2 message when both a radio-link failure (RLF) timer and a time-to trigger (TTT) timer are concurrently running. The RACH 2 message may be a message transmitted on a random-access channel for radio-resource control (RRC) connection re-establishment. The RLF timer may be activated as part of a radio-link monitoring (RLM) process based on radio-link conditions with a serving cell, and the TTT timer may have been activated as part of a HO process based on a measurement reporting event.

18 Claims, 5 Drawing Sheets

USER EQUIPMENT AND METHODS FOR FAST HANDOVER FAILURE RECOVERY IN 3GPP LTE NETWORK

PRIORITY CLAIMS

This application claims priority under 35 U.S.C. 119(e) to U.S. Provisional Patent Application Ser. No. 61/879,014, filed Sep. 17, 2013 [reference number P61026Z 4884.085PRV] and to U.S. Provisional Patent Application Ser. No. 61/898,425, filed Oct. 31, 2013 [reference number P61993Z 4884.090PRV] which are incorporated herein by reference in their entireties.

TECHNICAL FIELD

Embodiments pertain to wireless cellular communications. Some embodiments relate to 3GPP LTE (Long-Term-Evolution) networks. Some embodiments relate to handover (HO) failure in 3GPP LTE networks. Some embodiments relate to radio-link failure (RLF) in 3GPP LTE networks. Some embodiments relate to handover failure recovery and radio-link failure recovery.

BACKGROUND

When a mobile device (e.g., cell phone, UE) with an active or ongoing communication connection (e.g., voice or data call) is moving away from the coverage area of a first cell and entering the coverage area of a second cell, the communication connection is transferred to the second cell (target cell) in order to avoid link termination when the device gets out of coverage of the first cell (source cell). This "transfer of a connection" is termed handover or handoff. There may also be other reasons for performing a handover, such as load balancing.

In cellular networks, particularly 3GPP LTE heterogeneous networks, handover is becoming increasingly important for device mobility, particularly with the increasing use smaller cells and coverage areas overlaid with smaller cells. Some new use cases that are currently under discussion in 3GPP's RAN working groups (WGs) are dealing with "small-cell enhancements". The concept of small-cell enhancements involves deployment of additional low-power nodes under the macro-layer coverage for capacity extension and coverage improvement purposes. In small-cell enhancement situations, devices need to be handed over between these smaller and larger cells.

One issue with handover is handover failure. Handover failure may occur during certain conditions, such as when a device is undergoing radio-link failure. When handover failure occurs, service interruption may occur. This service interruption may be unsuitable for many applications.

Thus, there are general needs for techniques to reduce handover failure. There are general needs for techniques to reduce the service interruption time resulting during handover failure. There are also general needs for improved handover techniques that reduce handover failure with small-cell enhancements.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
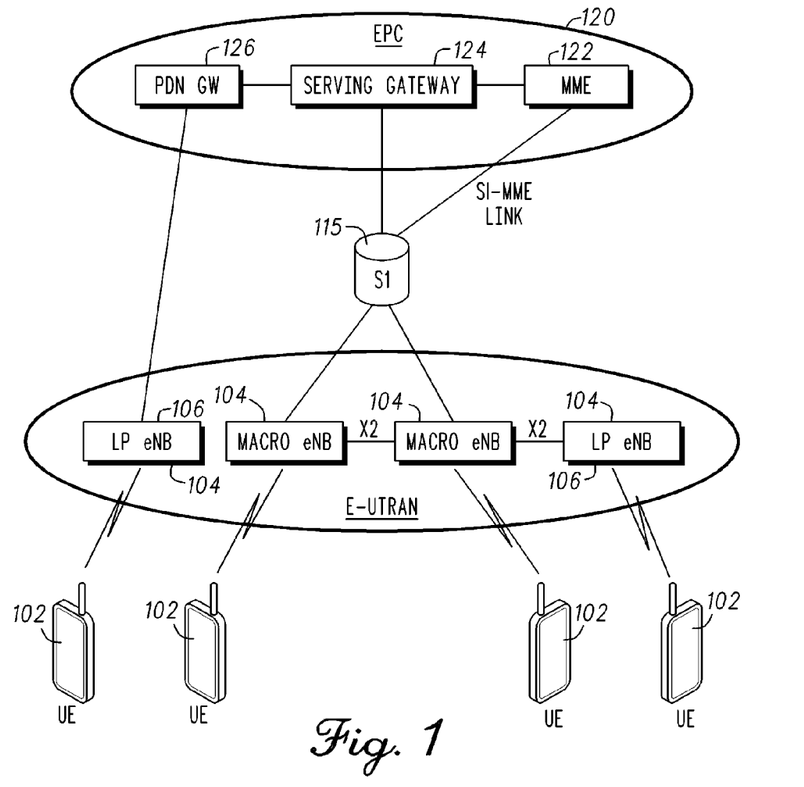
FIG. 1 shows a portion of an end-to-end network architecture of an LTE network with various components of the network in accordance with some embodiments.

FIG. 1 shows a portion of an end-to-end network architecture of an LTE network with various components of the network in accordance with some embodiments. The network 100 comprises a radio access network (RAN) 100 (e.g., as depicted, the E-UTRAN or evolved universal terrestrial radio access network) and the core network 120 (e.g., shown as an evolved packet core (EPC)) coupled together through an S1 interface 115. For convenience and brevity sake, only a portion of the core network 120, as well as the RAN 100, is shown. The core network 120 includes mobility management entity (MME) 122, serving gateway (serving GW) 124, and packet data network gateway (PDN GW) 126. The RAN 100 includes enhanced node B's (eNBs) 104 (which may operate as base stations) for communicating with user equipment (UE) 102. The eNBs 104 may include macro eNBs and low power (LP) eNBs 106.

In accordance with some embodiments, UEs 102 may be arranged for fast handover failure recovery. In these embodiments, a UE 102 may be configured to initiate handover (HO) failure recovery by early transmission of a random-access channel (RACH) 2 message. In some embodiments, the early transmission of the RACH 2 message may occur when both a radio-link failure (RLF) timer (T310) and a time-to trigger (TTT) timer are concurrently running. The RACH 2 message is a message transmitted on a random-access channel for radio-resource control (RRC) connection re-establishment. The RLF timer may be activated during radio-link failure as part of a radio-link monitoring (RLM) process and the TTT timer may be activated as part of a handover process. In these embodiments, HO failures that occur when a UE 102 experiences radio-link failure may be significantly reduced. Rather than waiting to transmit a RACH 2 message until after HO failure as part of the RLM process, embodiments disclosed herein provide for an early transmission of the RACH 2 message to initiate handover (i.e., transmission of the RACH 2 message with both the RLF timer and TTT timer are running and prior to the expiration of the RLF timer). In some embodiments, this may be the earliest possible RACH opportunity. These embodiments may help prepare a target cell for handover of the UE 102 and may reduce and/or eliminate service interruption time. These embodiments are discussed in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100 and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to a user's broadband line. Once plugged in, the femtocell connects to the mobile operator's mobile network and provides extra coverage in a range of typically 30 to 50 meters for residential femtocells. Thus, a LP eNB (e.g., such as eNBs 106) might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a physical downlink shared channel (PDSCH) may carry user data and higher-layer signaling to a UE 102. A physical downlink control channel (PDCCH) may carry information about the transport format and resource allocations related to the PDSCH channel, among other things. It also informs a UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
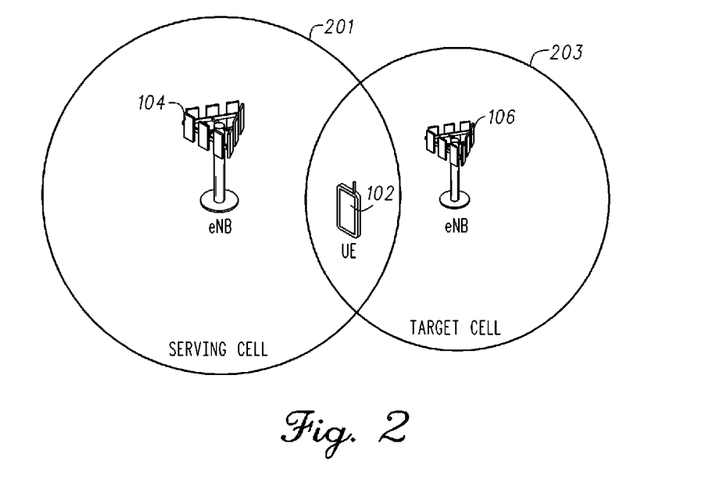
FIG. 2 illustrates handover of user equipment (UE) from a serving cell to a target cell in accordance with some embodiments.

FIG. 2 illustrates handover of a UE from a serving cell to a target cell in accordance with some embodiments. As illustrated in FIG. 2, an eNB 104 provides wireless communication services to communication devices, such as UE 102, within cell 201. The eNB 106 provides wireless communication services to communication devices within cell 203. The eNB 106 may be a lower power eNB, although the scope of the embodiments is not limited in this respect. A handover may be performed from eNB 104 to eNB 106 to handover communications with the UE 102 from a serving cell, such as cell 201 to a target cell, such as cell 203 as part of a handover process when certain handover criterion are met. These embodiments are described in more detail below.

Figure 3:
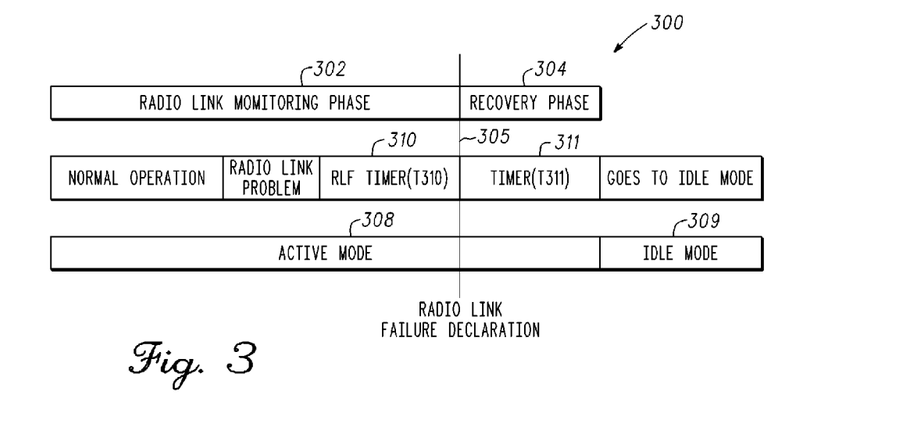
FIG. 3 illustrates a radio-link monitoring (RLM) process in accordance with some embodiments.

FIG. 3 illustrates a radio-link monitoring (RLM) process 300 in accordance with some embodiments. During the RLM process 300, a UE, such as UE 102, monitors the radio link during radio-link monitoring phase 302. In some embodiments, if an average wideband channel quality indicator (CQI) over a 200 ms time period goes below a threshold (e.g., Qout), an out-of-sync condition indication may be reported to the upper layers of the UE 102. If N310 times consequent out-of-sync condition indications are received by the upper layers, then the RLF timer (T310) 310 is started (i.e., activated). If the average wideband CQI over 100 ms goes above the threshold (e.g., Qin) and N311 times in-sync indications are reported before the RLF timer 310 expires, the RLF timer 310 is stopped and the radio link may be recovered. If the RLF timer 310 expires, a radio-link failure 305 may be declared and the UE 102 may enter the recovery phase 304 during which the RRC connection reestablishment procedure (resumption of SRB1 and activation of security) and a connection-reestablishment timer (T311) 311 are started. The RRC connection reestablishment procedure may succeed, for example, when the context of the UE 102 is available at a target cell 203. If connection reestablishment is successful, the connection-reestablishment timer T311 is stopped and the UE 102 may remain in active mode 308. If connection reestablishment is not successful, timer T311 may expire and the UE 102 may go into idle mode 309. Connection reestablishment may include cell selection. As discussed in more detail below, in accordance with embodiments, the UE 102 may be arranged for fast handover failure recovery by early transmission of a RACH 2 message when both the RLF timer (T310) 310 and a TTT timer are concurrently running.

Figure 4:
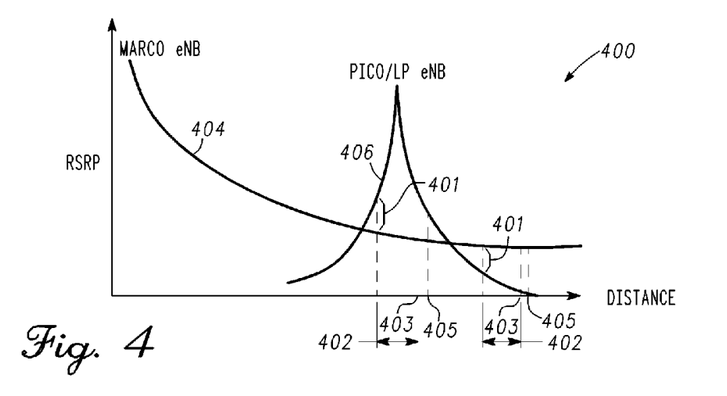
FIG. 4 illustrates a handover process in accordance with some embodiments.

FIG. 4 illustrates a handover process 400 in accordance with some embodiments. The handover process 400 may be initiated when a UE, such as UE 102 (FIG. 1), is moving into a coverage area of another cell (i.e., cell 203 (FIG. 2)). In some embodiments, the handover process 400 may be governed by certain events (e.g., Events 1, 2, 3, and/or 4 as defined in one of the 3GPP LTE standards) which may be based on a reference signal received power (RSRP) or a reference signal received quality (RSRQ). For example, the UE 102 may periodically measure the RSRP of neighboring cells. When the entering condition of an Event is satisfied (i.e., the Event is triggered), the handover process may be started. The RSRP based Event A3 is may be used for the 3GPP LTE handover process. The parameters that govern the HO process (Event A3) are a time-to-trigger (TTT), an A3 offset, a hysteresis, cell specific offsets (Ocn), and a frequency specific offset (Ofn). In the example illustrated in FIG. 4, when the RSRP 406 of a target cell goes above the RSRP 404 of serving cell by a threshold 401, the HO process may be initiated. The UE 102 may wait for a TTT period 402 (by starting the TTT timer) to send a measurement report at time 403 to the serving cell. The serving cell prepares the target cell via the X2 interface 115 (see FIG. 1) and may send a HO command to the UE 102 at time 405. The UE 102 may perform a contention (target not prepared) or non-contention (target prepared) based random access with the target cell by sending a RACH 2 message. As discussed in more detail below, in accordance with embodiments, the UE 102 may be arranged for fast handover failure recovery by early transmission of the RACH 2 message when both the RLF timer 310 (T310) and a TTT timer are concurrently running. In these embodiments, the RACH 2 message is transmitted when the RLF timer 310 and the TTT timer are both active and before (prior to) the RLF timer 310 or the TTT timer expires. This is unlike conventional techniques in which HO failure recovery is initiated by sending a RACH 2 message after HO failure occurs when the connection reestablishment timer 311 (i.e., timer T311) has already been activated.

Figure 5:
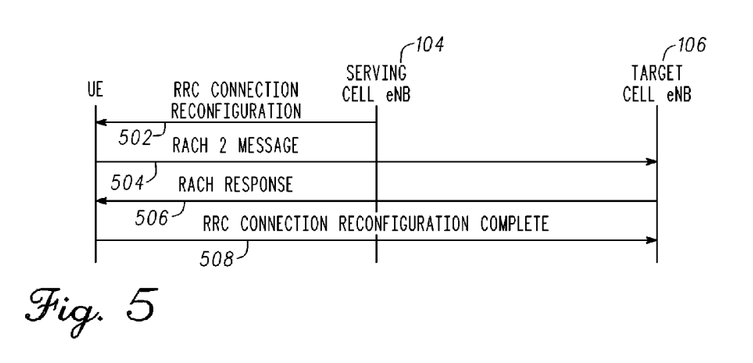
FIG. 5 illustrates non-contention based random access during handover in accordance with some embodiments.

FIG. 5 illustrates non-contention based random access during handover in accordance with some embodiments. In these embodiments, the UE 102 may receive an RRC connection reconfiguration message 502 from the serving cell eNB 104. The UE 102 may send a RACH 2 message 504 to the target cell eNB 106 (FIG. 1) as part of the handover process 300 (FIG. 3). When a RACH response message 506 is received from the target cell eNB 106, the UE 102 may send the RRC connection reconfiguration complete message 508 to the target cell since the target cell is prepared to accept the UE 102. As discussed in more detail below, in accordance with embodiments, the UE 102 may be arranged for fast handover failure recovery by early transmission of a RACH 2 message when both the RLF timer (T310) 310 and the TTT timer are concurrently running.

Conventionally, HO failure occurs when any one of the following happens:
The UL grant for the measurement report is lost;
The measurement report from the UE is lost;
The HO command from serving cell is lost;
The RACH message to target cell is lost.

Figure 7A:
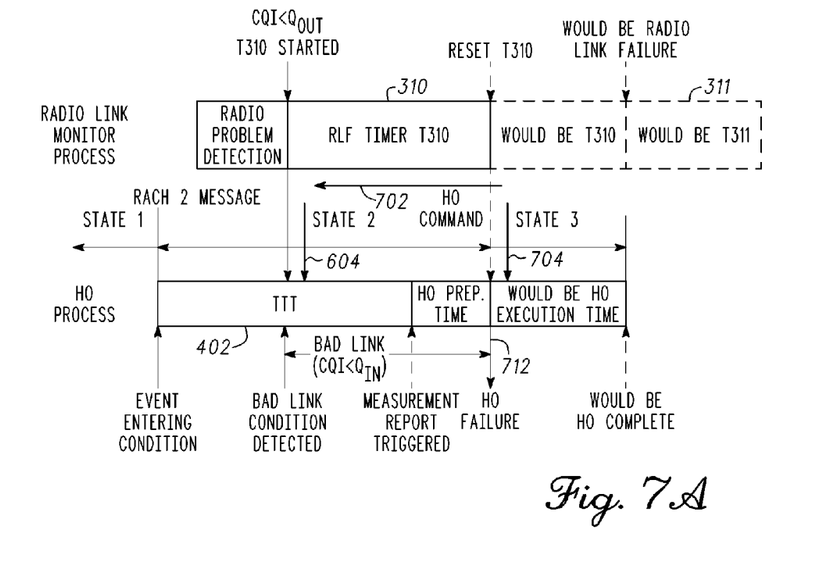
FIGS. 7A and 7B illustrate early transmission of a RACH 2 message in accordance with some embodiments in comparison with a conventional transmission of a RACH 2 message.
Figure 7B:
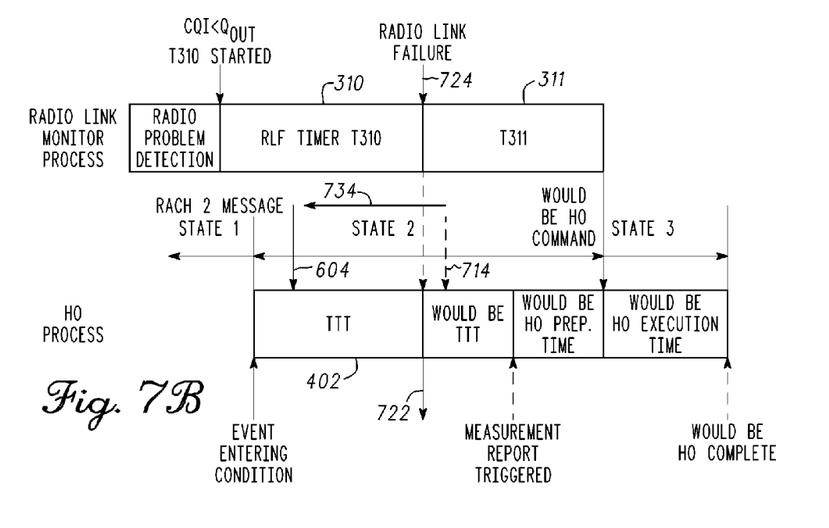

These failures may occur due to lower RSRP values from the serving or target cells and may occur during radio link failure. After HO failure, the UE 102 may have to start the network entry process by sending a RACH message to the strongest cell. "The HO command lost' may be the largest contributor towards the overall HO failure rate in an LTE network. Depending on the TTT and RLF (T310) timer expiry there are two failure scenarios: 1) when TTT timer expires while the RLF timer is running; and 2) when the RLF timer expires while the TTT timer is running. These scenarios are illustrated in FIGS. 7A and 7B described in more detail below.

One issue with these conventional techniques is that the recovery from RLF or HO failure starts after HO failure by initiating a network re-entry process at the UE. This results in a longer service interruption and larger latency or delay. Embodiments disclosed herein address these issues by transmitting RACH messages at the earliest possible instant when the RLF timer (T310) and TTT timer are overlapping. The RACH messages may be contention based or non-contention based depending on the intended cell. The target cell or another cell would be prepared early and recovery from handover failure and/or RLF may be faster than with conventional techniques. If HO failure or RLF does not actually occur, the cells and UE 102 may ignore the RACH message and the follow up messages.

Figure 6A:
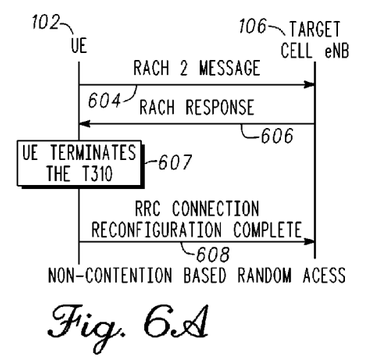
FIGS. 6A and 6B illustrate early transmission of a random-access channel (RACH) 2 message and early termination of a radio-link failure (RLF) timer (T310) in accordance with some embodiments.
Figure 6B:
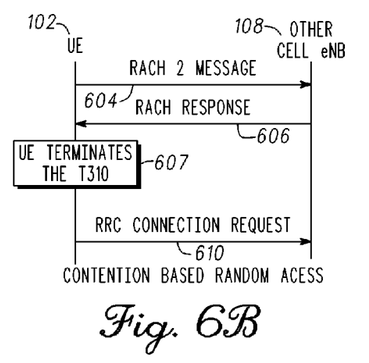

FIGS. 6A and 6B illustrate early transmission of a random-access channel (RACH) 2 message and early termination of a radio-link failure (RLF) timer (T310) in accordance with some embodiments. As illustrated in FIGS. 6A and 6B, a UE, such as UE 102, may initiate HO failure recovery by transmission of RACH 2 message 604 when both the RLF timer (T310) 310 (FIG. 3) and the TTT timer are concurrently running. In these embodiments, the RACH 2 message 604 is a message transmitted on a random-access channel for RRC connection re-establishment.

In accordance with these embodiments, the UE 102 may activate (i.e., set/start) the RLF timer (T310) as part of RLM process 300 (FIG. 3) based on radio-link conditions with a serving cell 201. The UE 102 may activate the TTT timer as part of a HO process 400 (FIG. 4) based on a measurement reporting event (e.g., Event A3 based on a difference between predetermined reference signals 301 of the serving cell 201 and a target cell 203). The UE 102 may determine when both the RLF timer 310 and the TTT timer are active (i.e., concurrently running) to initiate the HO failure recovery by transmission of the RACH 2 message 604.

In these embodiments, in response to receipt of a RACH response message 606, the UE 102 may terminate the RLF timer (T310) at operation 607 (e.g., because channel conditions with an eNB are presumed to be good) and either transmit an RRC connection reconfiguration complete message 608 (FIG. 6A) to a target cell eNB 106 for non-contention based random access, or transmit a RRC connection request message 610 (FIG. 6B) to a third cell 108 that is neither the target or the serving cell for contention-based random access.

In some of these embodiments, the RRC connection reconfiguration complete message 608 may be sent to the target cell 106 since the cell would have the UE context since the UE 102 had already initiated the HO process. In these embodiments, a RRC connection request message 610 (i.e., rather than a RRC connection reconfiguration complete message 608) may be sent to a third cell 108 since the third cell 108 does not have the context of the UE 102. The third cell 108 may be arranged to retrieve context from the current serving cell and may send a RACH response.

In these embodiments, the RACH 2 message 604 may be transmitted when the RLF timer 310 and the TTT timer are both active and before (prior to) expiration of either the RLF timer 310 or the TTT timer. In these embodiments, the UE 102 may concurrently perform the HO process 400 and RLM process 300 as separate and independent processes. Conventional HO failure recovery, on the other hand, is initiated by sending a RACH 2 message after HO failure occurs when the connection reestablishment timer 311 (i.e., timer T311) is activated.

In these embodiments, the RLF timer 310 (timer T310) may be started when a UE detects physical-layer related problems (e.g., when the UE receives N310 consecutive out-of-sync indications from lower layers). The RLF timer 310 may be stopped, for example, 1) when the UE receives N311 consecutive in-sync indications from lower layers; 2) upon triggering the handover procedure; or 3) upon initiating the connection reestablishment procedure. At expiry of the RLF timer 310, a radio link failure 305 (FIG. 3) may be declared. The UE 102 may remain in active mode 308 (FIG. 3) initiate a connection reestablishment procedure (recovery phase 304) or the UE 102 may be arranged to enter RRC idle mode 309 if a connection was not reestablished, depending on whether security is activated.

In these embodiments, the connection-reestablishment timer 311 (i.e., timer T311) may be started while initiating a connection reestablishment during the recovery phase 304 and may be stopped upon selection of suitable E-UTRAN cell or a cell using another RAT. At expiry of the timer T311, the UE 102 may be arranged to enter RRC idle mode 309 since a connection had not been established with a suitable cell.

In some embodiments, the RACH 2 message 604 is an unscheduled message that is transmitted on the random-access channel. In these embodiments, the RACH 2 message 604 may initiate an RRC connection re-establishment procedure. In these embodiments, the RACH 2 message 604 may comprise a preamble sequence (e.g., one of 64 possible sequences) that may be decoded by an eNB to identify the UE 102. In some embodiments, the RACH 2 message may include a Random Access Radio Network Temporary Identifier (RA-RNTI) of the UE 102.

In accordance with some LTE embodiments, UE 102 may be arranged to transmit various RACH messages including: a RACH 1 message for initial access from RRC idle mode, the RACH 2 message for RRC connection re-establishment, a RACH 3 message for handover, a RACH 4 message for downlink data arrival during RRC connected mode requiring a random access procedure (e.g., when uplink synchronization status is "non-synchronized"), a RACH 5 message for uplink (UL) data arrival during RRC connected mode requiring random access procedure (e.g., when UL synchronization status is "non-synchronized" or there are no PUCCH resources for SR available), and a RACH 6 message for positioning purposes during RRC connected mode requiring a random access procedure (e.g., when timing advance is needed for UE positioning).

In some embodiments, when the UE 102 does not receive a RACH response message 606 and the RLF timer 310 has not reset as part of the RLM process 300 (e.g., because channel conditions do not improve), the UE 102 may continue to perform the RLM process 300 and perform a connection reestablishment procedure upon expiration of the RLF timer 310. In these embodiments, the RLM process 300 may include sending another RACH 2 message to either the same cell or a different cell for link recovery as part of a connection reestablishment procedure upon expiration of the RLF timer 310.

In some embodiments, when the RACH 2 message 604 is transmitted to initiate HO failure recovery (i.e., when both the RLF timer 310 and the TTT timer are active), the RACH 2 message 604 may be transmitted to an eNB of a cell having a greatest received signal strength (e.g., a greatest RSRP). When the eNB is associated with either the target cell 203 or the serving cell 201, the RACH 2 message 604 may be transmitted in accordance with a non-contention random-access based technique (see FIG. 6A). When the eNB is associated with neither the target cell 203 nor the serving cell 201, the RACH 2 message 604 may be transmitted in accordance with a contention-based random-access technique (see FIG. 6B).

In these embodiments, when the RACH 2 message 604 is sent to either the target cell 203 or the serving cell 201, the target cell 203 and the serving cell 201 may both already have context for the UE 102 allowing either the target cell 203 or the serving cell 201 to respond with the RACH response message 606. In these embodiments, when the RACH 2 message 604 was sent to a third cell that was neither the target cell 203 nor the serving cell 201, a non-contention based technique may be used when the third cell has context for the UE 102 (i.e., due to the RLF process) and a contention based technique may be used when the third cell does not have context for the UE 102.

In some embodiments, when the TTT timer is running and the RLF timer 310 is not running (i.e., the radio link is not experiencing failure or is in the recovery phase 304), the UE 102 may continue to perform the HO process 400 (FIG. 4) and send a RACH 2 message 504 (FIG. 5) to the target cell eNB 106 after receipt of a RRC reconfiguration message 502 (FIG. 5) from the serving cell eNB 104. In these embodiments, a RACH 2 message would not be sent early. In some embodiments, a RACH 3 message may be sent during normal handover operations (i.e., when the UE 102 is not experiencing radio-link failure).

In some embodiments, the UE 102 may initially set the RLF timer (T310) based on a CQI (e.g., the wideband CQI) associated with a radio link with the serving cell as part of the RLM process 300. The UE 102 may set the TTT timer upon satisfaction of a measurement reporting event (i.e., when an event is triggered). In some embodiments, the TTT timer may be set upon the satisfaction of Event A3, which is based a difference between the RSRP of the serving cell and the target cell (e.g., threshold 401 (FIG. 4)). In some embodiments, the value if the TTT timer may be set using a Report Configuration information element (IE), although the scope of the embodiments is not limited in this respect.

FIG. 7A illustrates the early transmission of a RACH 2 message 604 in comparison with a conventional transmission of a RACH 2 message 704 in the situation when the TTT timer expires while the RLF timer 310 is active. FIG. 7B illustrates the early transmission of a RACH 2 message 604 in comparison with a conventional transmission of a RACH 2 message 714 when the RLF timer 310 expires while the TTT timer is active.

As illustrated in FIG. 7A, HO failure would conventionally occur at time 712 since either the measurement report had not be received by the serving cell or the HO command may not have been received by the UE 102. This would result in the transmission of RACH 2 message 704 conventionally as illustrated. As illustrated in FIG. 7A, RACH 2 message 604 is transmitted earlier than RACH 2 message 704 by time 702 which may allow a target cell to prepare for handover earlier and reduce or eliminate service interruption. In these embodiments, the RACH process is started earlier so the RLF recovery could be achieved earlier. In FIGS. 7A and 7B, state 1 is the time period before handover measurement event is triggered or the TTT is triggered, state 2 is the time period from when the TTT is triggered and the time when handover failure occurs, and state 3 is the handover recovery period after handover failure.

As illustrated in FIG. 7B, HO failure would conventionally occur at time 722 due to radio link failure at time 724 and resulting in the subsequent transmission of the RACH 2 message 714. As illustrated in FIG. 7B, RACH 2 message 604 is transmitted earlier than RACH 2 message 714 by time 732 which may allow a target cell to prepare for handover earlier and reduce or eliminate service interruption. In these embodiments, the RACH process is started earlier so the RLF recovery could be achieved earlier.

Figure 8:
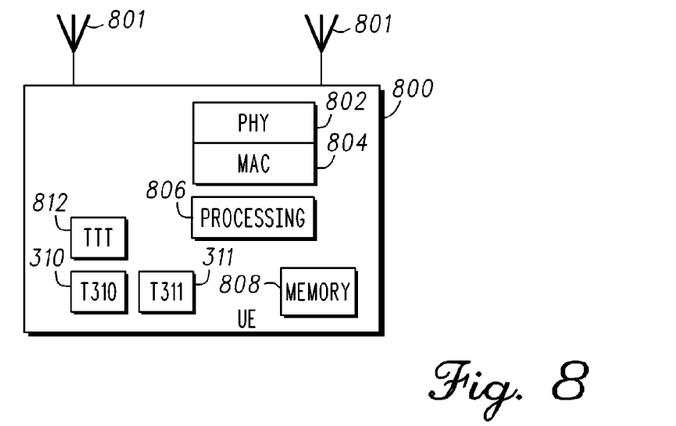
FIG. 8 illustrates a UE configured for early transmission of a RACH 2 message in accordance with some embodiments.

FIG. 8 illustrates a UE configured for early transmission of a RACH 2 message in accordance with some embodiments. UE 800 may be suitable for use as UE 102 (FIG. 1). The UE 800 may include physical layer circuitry (PHY) 802 for transmitting and receiving signals to and from eNBs 104 (FIG. 1) using one or more antennas 801. UE 800 may also include medium access control layer (MAC) circuitry 804 for controlling access to the wireless medium. UE 800 may also include processing circuitry 806 and memory 808 arranged to perform the operations described herein.

In accordance with some embodiments, the MAC circuitry 804 may be arranged to contend for a wireless medium configure frames or packets for communicating over the wireless medium and the PHY 802 may be arranged to transmit and receive signals. The PHY 802 may include circuitry for modulation/demodulation, upconversion/downconversion, filtering, amplification, etc. In some embodiments, the processing circuitry 806 may include one or more processors. In some embodiments, two or more antennas may be coupled to the physical layer circuitry arranged for sending and receiving signals. The memory 808 may be store information for configuring the processing circuitry 806 to perform the various operations described herein.

In accordance with embodiments, the UE 800 may also include a RLF timer 310, a TTT timer 812 and a connection-reestablishment timer 311 (e.g., T311). Processing circuitry 804 may be arranged to perform the RLM process 300 (FIG. 3) and the HO process 400 (FIG. 4). The processing circuitry 804 may also be configured to activate (i.e., set/start) the RLF timer 310 (T310) as part of the RLM process 300 based on radio-link conditions with a serving cell 201, and activate the TTT timer 812 as part of the HO process 400 based on a reporting event. The processing circuitry 804 may also be configured to determine when both the RLF timer and the TTT timer are active (i.e., concurrently running) to initiate the HO failure recovery by causing transmission of the RACH 2 message by the PHY 802.

In some embodiments, the UE 800 may be a mobile device and may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 800 may include one or more of a keyboard, a display, a non-volatile memory port, multiple antennas, a graphics processor, an application processor, speakers, and other mobile device elements. The display may be an LCD screen including a touch screen.

The antennas 801 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the UE 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 9:
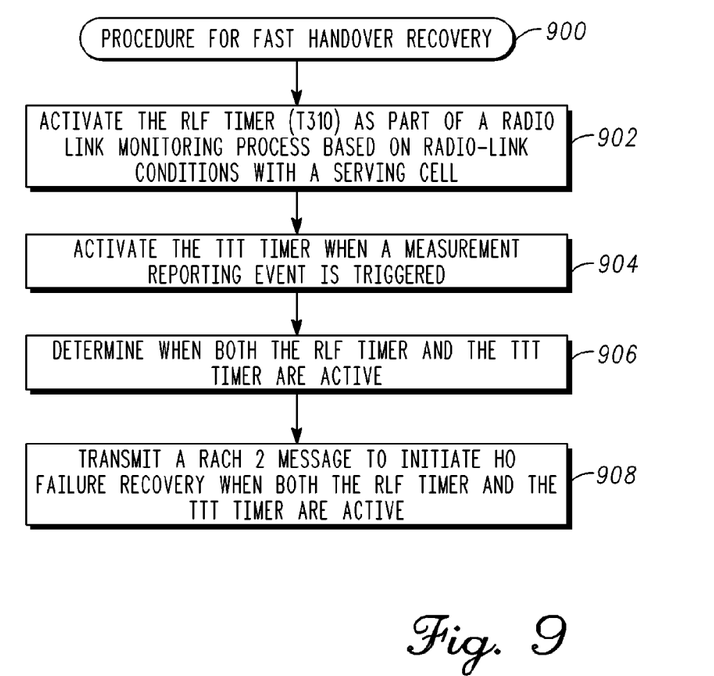
FIG. 9 illustrates a procedure for fast handover recovery in accordance with some embodiments.

FIG. 9 illustrates a procedure for fast handover recovery in accordance with some embodiments. Procedure 900 for fast handover recovery may be performed by a UE, such as UE 102 (FIG. 1) or UE 800 (FIG. 8).

In operation 902, the UE 102 may activate the RLF timer (T310) 310 (FIG. 8) as part of the RLM process 300 (FIG. 3) based on radio-link conditions with a serving cell 201.

In operation 904, the UE 102 may activate the TTT timer 812 (FIG. 8) as part of a HO process 400 (FIG. 4) based on a measurement reporting event (e.g., Event A3 based on a difference between predetermined reference signals 301 of the serving cell 201 and a target cell 103). The HO process 400 and RLM process 300 may be independent processes performed concurrently by the UE 102.

In operation 906, the UE 102 may determine when both the RLF timer 310 and the TTT timer 812 are active (i.e., concurrently running) to initiate the HO failure recovery.

In operation 907, the UE 102 may transmit a RACH 2 message to initiate HO failure recovery when it is determined that both the RLF timer 310 and the TTT timer 812 are active and before (prior to) expiration of either the RLF timer 310 or the TTT timer 812. This is unlike conventional techniques in which HO failure recovery is initiated by sending a RACH 2 message after HO failure occurs when the connection reestablishment timer 311 (i.e., timer T311) (FIG. 3) has already been activated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) comprising:
   physical layer circuitry and hardware processing circuitry configured to:
      initiate handover (HO) failure recovery by transmission of a random-access channel (RACH) 2 message when both a radio-link failure (RLF) timer and a time-to trigger (TTT) timer are concurrently running,
      wherein the RACH 2 message is a message transmitted on a random-access channel for radio-resource control (RRC) connection re-establishment.

2. The UE of claim 1 wherein the processing circuitry is further configured to:
   activate the RLF timer as part of a radio-link monitoring (RLM) process based on radio-link conditions with a serving cell;
   activate the TTT timer as part of a HO process based on a measurement reporting event; and
   determine when both the RLF timer and the TTT timer are active to initiate the HO failure recovery by transmission of the RACH 2 message,
   wherein the RACH 2 message is transmitted when the RLF timer and the TTT timer are both active and before either the RLF timer or the TTT timer expires.

3. The UE of claim 2 wherein the RACH 2 message is an unscheduled message that is transmitted on the random-access channel.

4. The UE of claim 2 wherein in response to receipt of a RACH response message, the UE is arranged to:
   terminate the RLF timer; and either
   transmit a RRC connection reconfiguration complete message to a target cell eNB for non-contention based random access, or
   transmit a RRC connection request message to another cell that is neither the target nor the serving cell for contention-based random access.

5. The UE of claim 4 wherein when the UE does not receive a RACH response message and the RLF timer has not reset as part of the RLM process, the UE is arranged to continue to perform the RLM process and perform a connection reestablishment procedure upon expiration of the RLF timer.

6. The UE of claim 2 wherein the RACH 2 message, when transmitted to initiate HO failure recovery when both the RLF timer and the TTT timer are active, is transmitted to an eNB of a cell having a greatest received signal strength,
   wherein when the eNB is associated with either a target cell or the serving cell, the RACH 2 message is transmitted in accordance with a non-contention random-access based technique, and
   wherein when the eNB is associated with neither the target cell nor the serving cell, the RACH 2 message is transmitted in accordance with a contention-based random-access technique.

7. The UE of claim 2 wherein when the TTT timer is running and the RLF timer is not running, the UE is arranged to continue to perform the HO process and send a RACH 2 message to a target cell eNB after receipt of a RRC reconfiguration message from the serving cell eNB.

8. The UE of claim 2 wherein the UE is arranged to initially set the RLF timer based on a channel quality indicator (CQI) associated with a radio link with the serving cell as part of the RLM process, and
   wherein the UE is arranged to set the TTT timer upon satisfaction of a measurement reporting event being triggered.

9. A method for fast handover failure recovery performed by User Equipment (UE), the method comprising:
   initiating handover (HO) failure recovery by transmission of a random-access channel (RACH) 2 message when both a radio-link failure (RLF) timer and a time-to trigger (TTT) timer are concurrently running; and
   terminating the RLF timer in response to a RACH response message,
   wherein the RACH 2 message is a message transmitted on a random-access channel for radio-resource control (RRC) connection re-establishment.

10. The method of claim 9 wherein after receipt of the RACH response message, the method further comprises:
    transmitting a RRC connection reconfiguration complete message to a target cell eNB for non-contention based random access, or
    transmitting a RRC connection request message to another cell that is neither the target nor a serving cell for contention-based random access.

11. The method of claim 10 further comprising:
    activating the RLF timer as part of a radio-link monitoring (RLM) process based on radio-link conditions with a serving cell;
    activating the TTT timer as part of a HO process based on a measurement reporting event; and
    determining when both the RLF timer and the TTT timer are active to initiate the HO failure recovery by transmission of the RACH 2 message,
    wherein the RACH 2 message is an unscheduled message that is transmitted when the RLF timer and the TTT timer are both active and before either the RLF timer or the TTT timer expires.

12. The method of claim 11 wherein when the UE does not receive a RACH response message and the RLF timer has not reset as part of the RLM process, the method further comprises continuing to perform the RLM process and performing a connection reestablishment procedure upon expiration of the RLF timer.

13. The method of claim 9 wherein the RACH 2 message, when transmitted to initiate HO failure recovery when both the RLF timer and the TTT timer are active, is transmitted to an eNB of a cell having a greatest received signal strength.

14. The method of claim 13 wherein when the eNB having the greatest received signal strength is associated with either a target cell or serving cell, the RACH 2 message is transmitted in accordance with a non-contention random-access based technique, and
    wherein when the eNB having the greatest received signal strength is associated with neither the target cell nor the serving cell, the RACH 2 message is transmitted in accordance with a contention-based random-access technique.

15. The method of claim 11 wherein when the TTT timer is running and the RLF timer is not running, the UE is arranged to continue to perform the HO process and send a RACH 2 message to the target cell eNB after receipt of a RRC reconfiguration message from the serving cell eNB.

16. A non-transitory computer-readable storage medium that stores instructions for execution by one or more processors to perform operations for fast handover failure recovery by User Equipment (UE), the operations to configure the or more processors to:
    initiate handover (HO) failure recovery by transmission of a random-access channel (RACH) 2 message when both a radio-link failure (RLF) timer and a time-to trigger (TTT) timer are concurrently running; and
    terminate the RLF timer in response to a RACH response message,
    wherein the RACH 2 message is a message transmitted on a random-access channel for radio-resource control (RRC) connection re-establishment.

17. The non-transitory computer-readable storage medium of claim 16 wherein the operations further configure the one or more processors to:
    activate the RLF timer as part of a radio-link monitoring (RLM) process based on radio-link conditions with a serving cell;
    activate the TTT timer as part of a HO process based on a measurement reporting event; and
    determine when both the RLF timer and the TTT timer are active to initiate the HO failure recovery by transmission of the RACH 2 message,
    wherein the RACH 2 message is an unscheduled message that is transmitted when the RLF timer and the TTT timer are both active and before either the RLF timer or the TTT timer expires.

18. The non-transitory computer-readable storage medium of claim 17 wherein when the UE does not receive a RACH response message and the RLF timer has not reset as part of the RLM process, the operations further configure the one or more processors to perform the RLM process and perform a connection reestablishment procedure upon expiration of the RLF timer.

\* \* \* \* \*